Jan. 13, 1942.   D. C. SHARP   2,269,887
LUBRICATED VALVE
Filed Feb. 10, 1940   3 Sheets-Sheet 1

DUDLEY C. SHARP
INVENTOR.
BY Jesse R. Stone
Lester B. Clark
ATTORNEYS

Jan. 13, 1942.  D. C. SHARP  2,269,887
LUBRICATED VALVE
Filed Feb. 10, 1940  3 Sheets-Sheet 2

DUDLEY C. SHARP,
INVENTOR.
BY Jesse R Stone
Lester B. Clark
ATTORNEYS.

Jan. 13, 1942.     D. C. SHARP     2,269,887
LUBRICATED VALVE
Filed Feb. 10, 1940     3 Sheets-Sheet 3

DUDLEY C. SHARP
INVENTOR.
BY Jesse R. Stone
Lester B Clark
ATTORNEYS.

Patented Jan. 13, 1942

2,269,887

UNITED STATES PATENT OFFICE 2,269,887

LUBRICATED VALVE

Dudley C. Sharp, Houston, Tex., assignor to Mission Manufacturing Company, Houston, Tex.

Application February 10, 1940, Serial No. 318,246

14 Claims. (Cl. 251—93)

The invention relates to a lubricated type of plug valve and has certain features of advantage including the arrangement of the lubricant conducting and sealing passages, the reservoirs for storing the lubricant, the manner of manufacture and assembly and the structure for confining the lubricant.

In lubricated valves it is the object to provide a seal about the downstream side of the plug member so as to prevent leakage to the downstream passage of the valve and with this in mind the present valve has been constructed so that a complete seal may be maintained regardless of which side of the valve is turned to the downstream side and wherein the line pressure in the pipe which carries the valve is utilized to force the lubricant into sealing position.

It is one of the objects of the invention to provide a circular seal about the outlet port in a valve housing by providing a semi-circular groove on the plug member and a semi-circular groove on the housing or seat, which grooves will be complementary when the valve is in closed position and wherein the line pressure may be applied to the plug member to force lubricant into such grooves.

Another object of the invention is to provide a semi-circular groove upon the plug member and upon a seat in a lubricated plug valve.

Another object of the invention is to provide a two-part plug valve member wherein the parts are identical in construction.

Another object of the invention is to provide a two-part plug member for lubricated plug valves wherein a reservoir is provided in each section of the member.

Another object of the invention is to provide a lubricant retainer plug which can be loosened to admit lubricant under pressure and then screwed into seated position to confine the lubricant.

Another object of the invention is to provide a plug valve with a base member which can be inserted to confine the operating parts.

Other and further objects of the invention will be readily apparent when the following description is considered in connection with the accompanying drawings, wherein.

Figure 2:
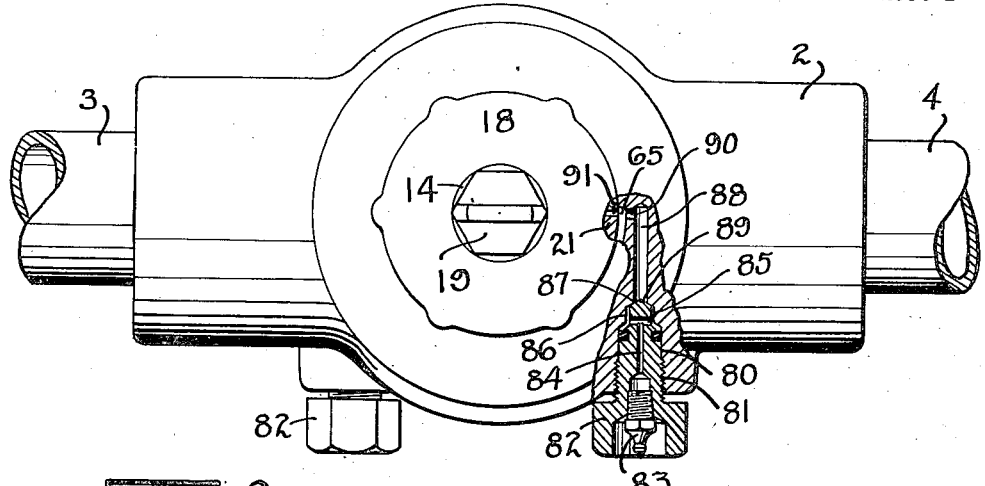
Fig. 2 is a top plan elevation with certain parts broken away to illustrate the manner of applying and retaining the lubricant.
Figure 1:
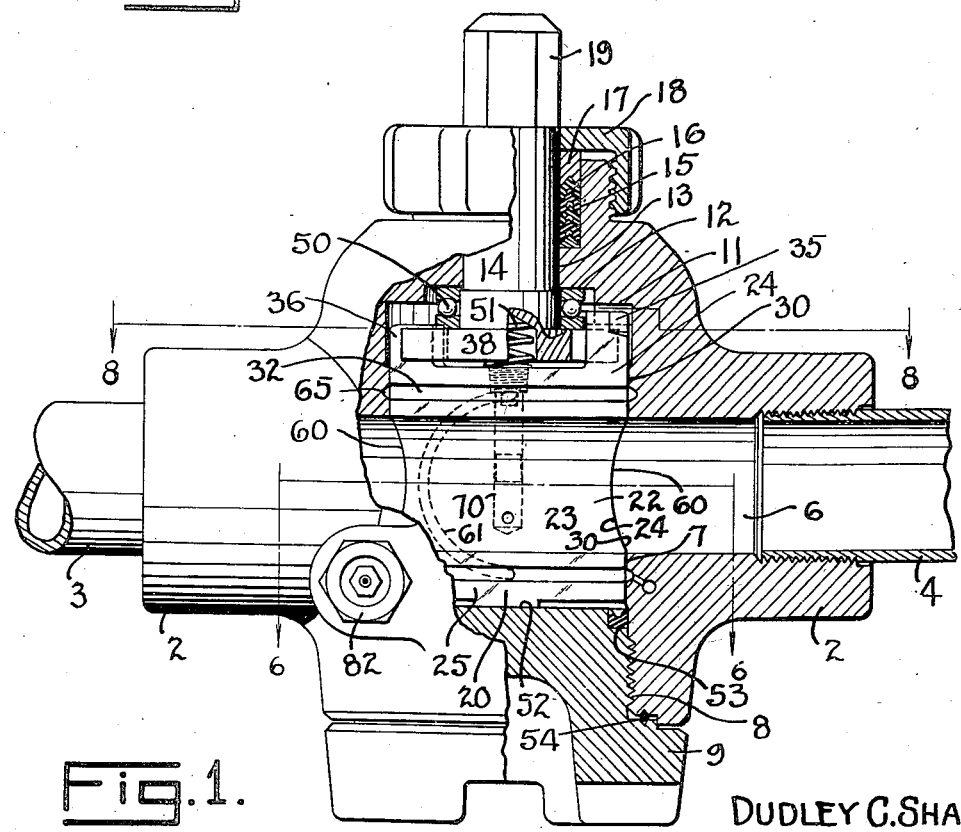
Fig. 1 is a side elevation of a valve to which the invention has been applied and illustrating the plug member in open position.
Figure 6:
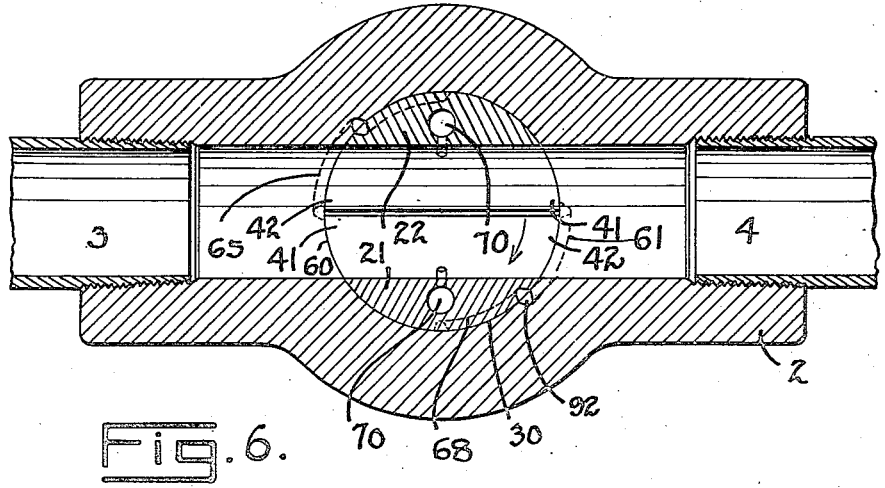
Fig. 6 is a section taken on the line 6—6 of Fig. 1 to illustrate the construction of the parts.

In Fig. 1 the valve housing is indicated generally at 2 and has the line pipes 3 and 4 threaded into the ends thereof. For purposes of description either pipe may be considered as the high pressure pipe and either pipe as the low pressure pipe. In other words, the valve can be utilized with the pressure applied from either side thereof. The valve housing has the transverse passage 6 therethrough which is intersected by the valve chamber 7. As seen in the drawings, the passage 6 is horizontal and the chamber 7 is vertical. As seen in Fig. 6, the chamber 7 is cylindrical and is threaded at 8 adjacent its lower end to receive the base 9 of the valve member. The upper portion of the chamber 7 is defined by the stepped shoulders 11 and 12, respectively. A neck portion 13 defines a passage for the valve stem 14 and a recess 15 receives the packing 16 and the lateral ring 17, both of which are held in place by the cap 18. The valve stem 14 is rotatable by the application of a wheel or handle to the non-circular portion 19 thereof.

Figure 3:
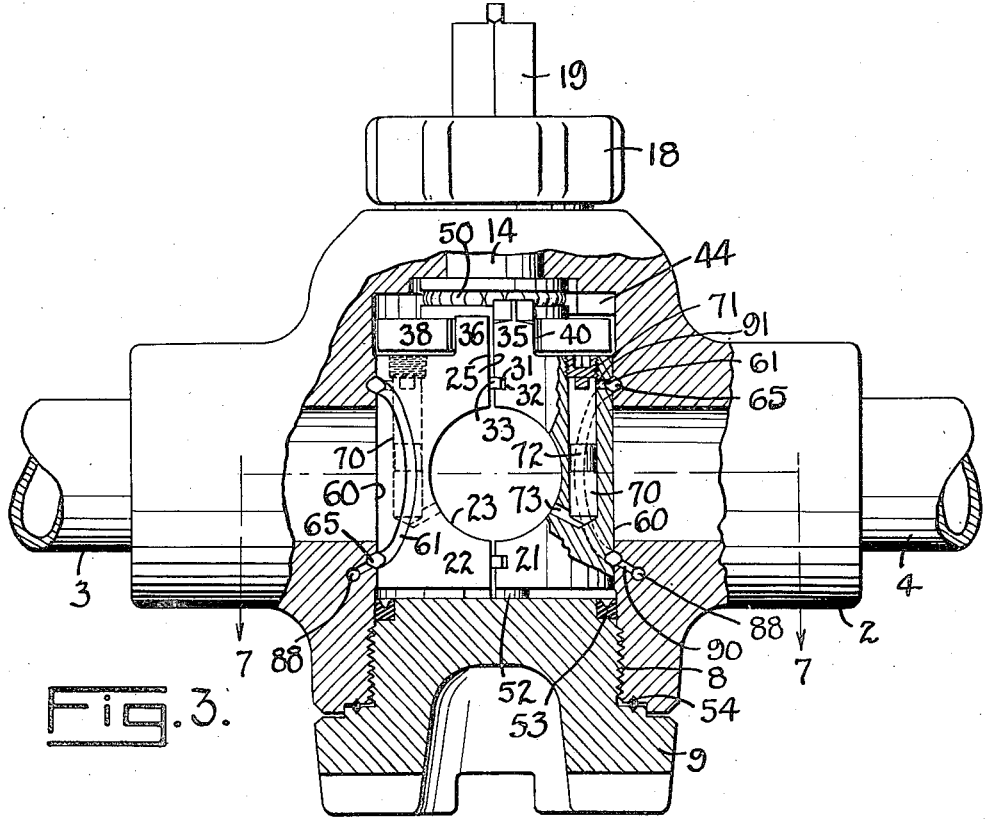
Fig. 3 is a side elevation with certain parts in section illustrating the valve in closed position.
Figures 7, 8:
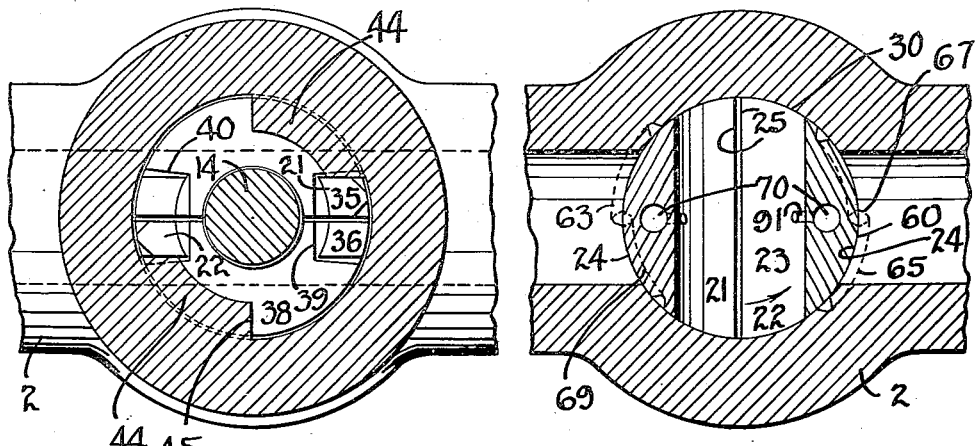
Fig. 7 is a section taken on the line 7—7 of Fig. 3 and illustrates the valve parts in closed position.
Fig. 8 is a section taken on the line 8—8 of Fig. 1 to illustrate the operating mechanism.

The plug member 20, which makes up the valve, is made of two complementary halves 21 and 22, as is best apparent from Figs. 3, 6 and 7. These two halves are each a substantial semi-circular body which have curved peripheral faces 24 and flat central faces 25. Extending across the axis of each of the body members 21 and 22 is a semi-circular recess 23. These two recesses cooperate together to provide a continuation of the passage 6 through the valve housing 2 when the plug member is in open position as seen in Figs. 1, 6 and 8.

Figure 10:
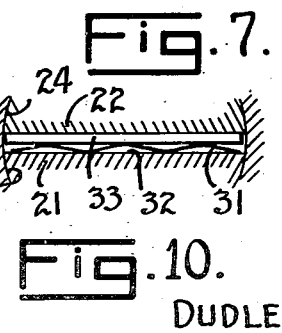
Fig. 10 is a broken detail section illustrating the manner of urging the two sections of the valve member apart.

In order to urge the bodies 21 and 22 away from each other and to contact the seating surfaces 24 against the circular seat 30 in the valve housing a leaf spring 31 has been positioned between the bodies 21 and 22 in a groove 32 which extends transversely across the flat face 25 of one of the valve bodies. A spacer strip 33 is also positioned in this groove 31 and overlies the spring. The spring urges this spacer bar against the opposite valve body and this arrangement is best seen in Figs. 3 and 10.

Figure 4:
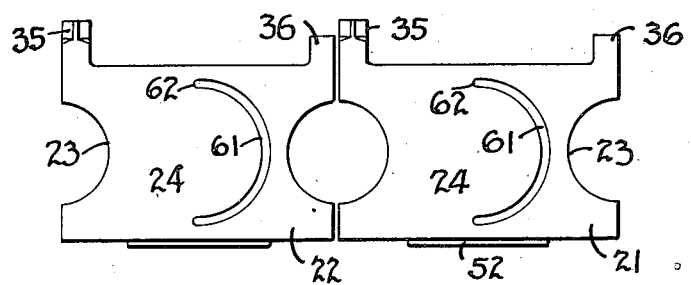
Fig. 4 is a layout view of the surface of the plug sections.

The valve bodies 21 and 22 are each provided with an upstanding lug 35 at one edge thereof, as best seen in Figs. 4 and 8, while the opposite edge of the body members is provided with a somewhat shorter lug 36. These lugs are thus arranged in pairs, as seen in Fig. 8, and are upstanding in the chamber 7 adjacent the shoulder 11.

Figure 9:
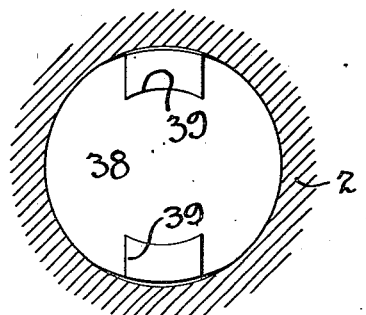
Fig. 9 is a bottom plan view looking at the base of the stem and operating head.

In order to turn the plug member as a whole the valve stem 14 is provided with a head 38. This head is shown in bottom plan view in Fig. 9 and is generally circular but has the cut out recess 39 at each side thereof. These recesses are tapered slightly on the edges thereof and are arranged to straddle a pair of lugs 35, 36, as seen in Fig. 8. In this manner as the stem 14 is turned the side 40 of the recess adjacent the lugs 35 will contact those lugs and as the stem is turned the lug will urge the forward edge of each of the body members away from the seat 30, thus tending to break the seal with the seat and facilitate the turning of the valve member. This may be accomplished due to the provision of the spring 31 which allows a slight relative movement between the round edge of each of the bodies with respect to the rear edge of the complementary body. In other words, if an attempt is made to turn the valve to the right as viewed in Fig. 6, the leading edge would be at 41 of the body 22 and the trailing edge would be at 42 on the body 21, whereas the reverse would be true on the opposite or lefthand edge, as seen in Fig. 6.

In order to determine the amount of turning of the plug member as a whole relative to the valve housing a pair of stop sectors or segments 44 project downwardly into the top of the valve chamber, as may be best seen at 44 in Fig. 3. These segments are shown in section in Fig. 8. Each of these segments has a face 45 which is arranged to receive the lug 35 when the valve plug has been turned through an angle of 90°. In this manner a stop is provided which places the plug member in the proper closed position as seen in Fig. 7.

When the valve is to be opened the reverse of the operation just described occurs and the trailing edge of the valve bodies is broken loose by the opposite side of the recess 39 and the lug 35 is returned to a position abutting the opposite end of the opposite stop segment 44, so that the parts will be in the position shown in Fig. 8.

A set of anti-friction bearings 50 normally absorb any upward thrust of the stem 14 and this bearing is positioned against the shoulder 12 below the neck 13 of the valve housing. A collar spring 51 may be arranged in a recess in the base of the head 38 and may abut against the top of the valve bodies 21 and 22 so as to normally urge them away from the stem 14.

In assembling the valve the stem and head 14 will be inserted from the base of the valve chamber 7 along with the anti-friction bearings 50. The spring 51 and the valve bodies 21 and 22 may be inserted simultaneously with the stem or they may be inserted thereafter as desired. In any event the parts will be moved into the chamber from below and the projection 52 on the lower end of each of the valve bodies is arranged to be abutted by the base member 9. A packing 53 may be positioned about the upper edge of the base member so as to protect the thread 8 against leakage. When the plug is screwed firmly into position as seen in Fig. 1 the spring 51 will be compressed somewhat and the parts will be held firmly in position. If desired a metal seal ring 54 may also be provided to protect the threads 8 from pressures and corrosion.

Figure 5:
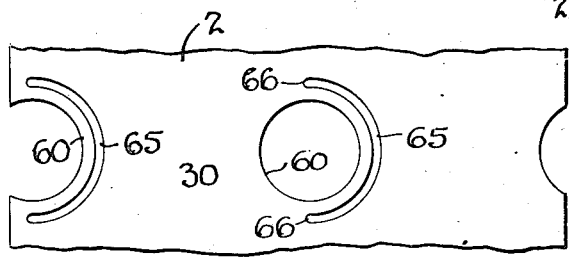
Fig. 5 is a layout view of the seat inside of the valve housing.

In order to assist in maintaining a seal about the ends of the passage 6 where they merge with the valve member to prevent leakage when the valve is in closed position a lubricating system has been devised. To provide a complete seal about each of the ports 60 at the edge of the valve chamber a circular groove has been provided. As seen in Figs. 4 and 5 a semi-circular groove 61 is provided in the periphery 24 of each of the valve bodies 21 and 22. This groove has its ends 62 in a vertical plane so that it is arranged to encircle one-half of the port 60 as is best seen by the dotted line 63 of Fig. 7. The other half of the complete circle groove about each port 60 is formed by the groove 65 in the seat 30 and this groove 65 has its ends 66 also disposed in a vertical plane and encircles one-half of the port 60. When the valve is moved to the closed position as seen in Fig. 7 the two grooves 61 and 65 have their ends 62 and 66 overlapped slightly, as at 67, so that they will communicate with each other. In this manner a complete circle is formed about each of the ports. Figs. 4 and 5 show the surfaces of the two body members 21 and 22 and the seat 30 of the housing 2 laid out in plan view to illustrate definitely the manner of their construction.

It will be apparent from the foregoing construction that when the valve plug is moved in a clockwise direction, as seen in Fig. 6, to move it from open to closed position, the groove 61 will move from the dotted line position 68 of Fig. 6 around to the dotted line position 69 of Fig. 7. In the open position the central or back portion of the grooves 61 and 65 are overlapped so that lubricant may be forced from one to the other as seen in Fig. 6, whereas when the valve is moved to the closed position, as shown in Fig. 7, then the groove 61, which was previously in communication with one of the grooves 65 as at 92, as seen in Fig. 6, will now move to have its ends 62 in communication with the other groove 65 on the opposite side of the seat, as seen in Fig. 7. Attention is directed to the fact that the grooves 61 in the plug member never pass over a port 60 but move up to encircle one-half of the port when the valve is in closed position, as seen in Fig. 7, and move backward around the seat in a counter-clockwise direction when the valve is moved to open position so that they assume the position of Fig. 6.

In order to provide lubricant for the grooves 61 so that it may be forced into the grooves 65 when they are placed in sealing communication with each other a reservoir 70 has been provided in each one of the members 21 and 22 as in Fig. 7. Each of these reservoirs is in the form of a vertical recess, as seen in Fig. 3. This recess opens into the valve body from the top and is closed by a plug 71. Slidably disposed within each reservoir is a plunger or piston 72 which is arranged to serve as a barrier for the lubricant to protect it from contamination with the pressure fluid utilized to force the lubricant into the grooves. This plug also prevents the pressure from blowing through the reservoir. An opening 73 is provided in each of the recesses 23 which leads from the recess into the base of the reservoir, as seen in Fig. 3. In this manner, regardless of whether the valve is open or closed, the pressure existing in the pipes 3 or 4, whichever is the high pressure pipe, will be available in the passage 23, in the opening 73, and in the base of the reservoir against the piston or plunger 72. Thus the high pressure which is being sealed off by the valve will always be available in both of the reservoirs 70 regardless of the position of the plug.

From the foregoing it will be apparent that the greater pressure in the pipe line will be available to force lubricant into the sealing grooves on the down stream segment or body of the plug. Of course, this pressure will be practically balanced on that part or segment of the plug which is facing the high pressure side. This higher pressure will be available against the entire inside face 25 of the body member or segment of the plug which is contacting the low pressure outlet port 60. This portion of the plug will be forced against the seat 30 in the valve housing by this higher pressure because the downstream side of the valve will have a lesser or possibly no pressure therein. The higher pressure will be available in the reservoir 70 of the down stream segment of the plug so as to exert a pressure on the lower side of the piston 72 forcing it along in the reservoir to discharge lubricant from the reservoir so as to maintain the lubricant in the circular groove about this downstream port 60.

In view of the fact that the plug members are duplicates it seems obvious that it is immaterial as to how the plug is assembled or how it is positioned in the pipe line because either side of the valve can be utilized as the high pressure or the low pressure side, as the circumstances may require. This feature is pointed out because with many types of lubricated valves only one side can be used as the high pressure side. It must be inserted properly in the pipe line and if the direction of flow is reversed in the line then the valve must be removed and reversed or else it will not operate satisfactorily, whereas with the present valve such features are immaterial.

In order to introduce lubricant into the reservoirs 70 each side of the valve may be provided with an opening 80, which is threaded at 81 to receive the closure plug 82. This plug has a lubricant tool-receiving fitting 83, which may be removed and replaced by a complete closure plug, if desired. Such a feature is not necessary, however, because of the peculiar construction of the closure plug 82, in that it has an axial passage 84 through which the lubricant will flow when it is introduced into the lateral opening 85. In this manner lubricant passes through the plug into the reduced section 86 of the opening 80. This reduced section 86 has a seat 87 therein which merges with the passage 88 and the end of the closure plug 82 has a tapered seating surface 89 to engage the seat 87. When lubricant is to be introduced the plug 82 is unscrewed slightly so as to separate the seats 87 and 89. This allows lubricant to be forced into the passage 88. When a sufficient amount of lubricant has been forced into position then the closure plug 82 can be turned to re-engage the seats 87 and 89. In this manner the lubricant is locked in position or trapped in the passage 88 and a secure seal has been provided to retain the lubricant.

The passage 88 as seen in Fig. 3 leads into a side or lateral passage 90 which enters the lower end 66 of the groove 65 so that when lubricant is forced into the passage 88 it will flow through this passage 90 into the groove 65 to the upper end thereof and into the groove 61 if the valve is in closed position as seen in Fig. 3. A lateral passage 91 there joins the groove 61 with the reservoir 70 so that in this manner lubricant can be forced through the groove 65 and 61 into the reservoir 70 so as to cause the plunger or piston 72 to move downwardly into the reservoir against the line pressure.

If the valve should be in open position, as seen in Fig. 6, then, of course, the lubricant would only flow half way through the groove 65 where it would pass into the groove 61 where the halves are joined together as seen in Fig. 6 at 92. Thus in either event regardless of the position of the figures lubricant may be introduced by merely unscrewing the plug closure 82, forcing the lubricant into the reservoir and then tightening the closure plug 82. Each of the reservoirs 70 can be filled in this manner.

Broadly the invention contemplates a lubricated plug valve which can be economically assembled and maintained and which is capable of use as a two-way valve in that either side can be used as the high pressure side and wherein a complete and automatically operating lubricating system is provided.

What is claimed is:

1. A lubricated valve including a housing, a passage therethru, a valve chamber, a plug rotatable in said chamber, and means to lubricate and seal the contacting faces of said housing and plug including independent substantially semicircularly grooved areas in each said housing and plug, said areas being arranged in separate complementary pairs to encircle the passage thru the housing when the valve is closed.

2. A valve of the character described including a housing, a valve chamber therein, a passage thru the housing crossing said chamber, a plug member having a port to open or close the passage, a semi-circular groove curved about one-half of the passage at each side of the chamber, a semi-circular groove at each side of the plug member, the housing and plug grooves being complementary when the valve is closed to provide a full circular groove about the passage at each side of the chamber.

3. A valve of the character described including a housing, a valve chamber therein, a passage thru the housing crossing said chamber, a plug member having a port to open or close the passage, a semi-circular groove curved about one-half of the passage at each side of the chamber, a semi-circular groove at each side of the plug member, the housing and plug grooves being complementary when the valve is closed to provide a full circular groove about the passage at each side of the chamber, and means to apply lubricant under pressure to said grooves.

4. A valve of the character described including a housing, a valve chamber therein, a passage thru the housing crossing said chamber, a plug member having a port to open the passage and an imperforate portion to close said passage, a semi-circular groove about one-half of the passage at each side of the chamber, a semi-circular groove on the imperforate portion at each side of the plug member, the housing and plug grooves being complementary when the valve is closed to provide a circular groove about the passage at each side of the chamber, and means to apply lubricant under pressure to said grooves including means operable by the pressure being closed by the valve.

5. A valve of the character described including a housing, a valve chamber therein, a passage thru the housing crossing said chamber, a plug member having a port to open the passage and an imperforate portion to close said passage, a semi-circular groove about one-half of the passage at each side of the chamber, a semi-circular groove at each side of the plug member having its open side away from the nearest port, the housing and plug grooves being complementary when the valve is closed to provide a circular groove about the passage at each side of the chamber, and means to apply lubricant under pressure to said grooves comprising a reservoir in said plug member.

6. A plug valve including a housing and plug member to control the flow of fluid under pressure, said member comprising a pair of complementary sections, means to move said sections, means to lubricate the face of each of the sections independently of the other section including a reservoir for lubricant in each section, separate means to conduct lubricant from the reservoir of each section to the sealing face thereof, and means to conduct the pressure of the fluid controlled into each reservoir.

7. A plug valve including a housing and plug member to control the flow of fluid under pressure, said member comprising a pair of complementary sections, means to move said sections, means to lubricate the face of each of the sections independently of the other section including a reservoir for lubricant in each section, separate means to conduct lubricant from the reservoir of each section to the sealing face thereof, and means to conduct the pressure of the fluid controlled into each reservoir from between the sections.

8. A plug valve including a housing and plug member to control the flow of fluid under pressure, said member comprising a pair of complementary sections, means to move said sections, means to lubricate the face of each of the sections independently of the other section including a reservoir for lubricant in each section, separate means to conduct lubricant from the reservoir of each section to the sealing face thereof, and a floating piston in each reservoir to which the pressure of the fluid controlled is applied.

9. A plug valve including a housing and plug member to control the flow of fluid under pressure, said member comprising a pair of complementary sections each having a face to seal with the housing, means to move said sections, and means to lubricate the sealing faces of each of the sections independently of the other section including a reservoir for lubricant in each section, the sealing face of each section having a semi-circular groove therein, and separate means to conduct lubricant from the reservoir of each section to the semi-circular groove therein.

10. A plug valve including a housing and plug member to control the flow of fluid under pressure, said member comprising a pair of complementary sections each having a face to seal with the housing, means to move said sections, means to urge the section apart, and means to lubricate the sealing faces of each of the sections independently of the other section including a reservoir for lubricant in each section, the sealing face of each section having a semi-circular groove therein and semi-circular groove in the housing which is complementary with each section groove when the plug is in closed position, and separate means to conduct lubricant from the reservoir of each section to the semi-circular groove therein.

11. A plug valve including a housing, a two part plug member therein, means to normally urge the parts apart, and means to lubricate the surfaces of the parts and provide a seal about the valve passageway including separate means for feeding lubricant to the sealing surface of each of the parts of the plug member.

12. A plug valve including a housing, a two part plug member therein, means to normally urge the parts apart, and means to lubricate the surfaces of the parts and provide a seal about the valve passageway including a circular groove about the passageway and including separate means for feeding lubricant to the sealing surfaces of each of the parts of the plug member at each side of the valve when the plug is closed.

13. A plug valve including a housing, a two part plug member therein, means to normally urge the parts apart, and means to lubricate the surfaces of the parts and provide a seal about the valve passageway including a circular groove about the passageway and including separate means for feeding lubricant to the sealing surfaces of each of the parts of the plug member at each side of the valve when the plug is closed, one half of each circular groove being in the housing and one half in the plug.

14. As an article of manufacture a section of a plug valve member comprising a semicylindrical body, a semi-circular groove in the curved periphery thereof, a semi-cylindrical recess transversely of the body, a lubricant reservoir in said body, an inlet to the reservoir for lubricant, and an outlet from the reservoir to supply lubricant to said groove.

DUDLEY C. SHARP.